UNITED STATES PATENT OFFICE.

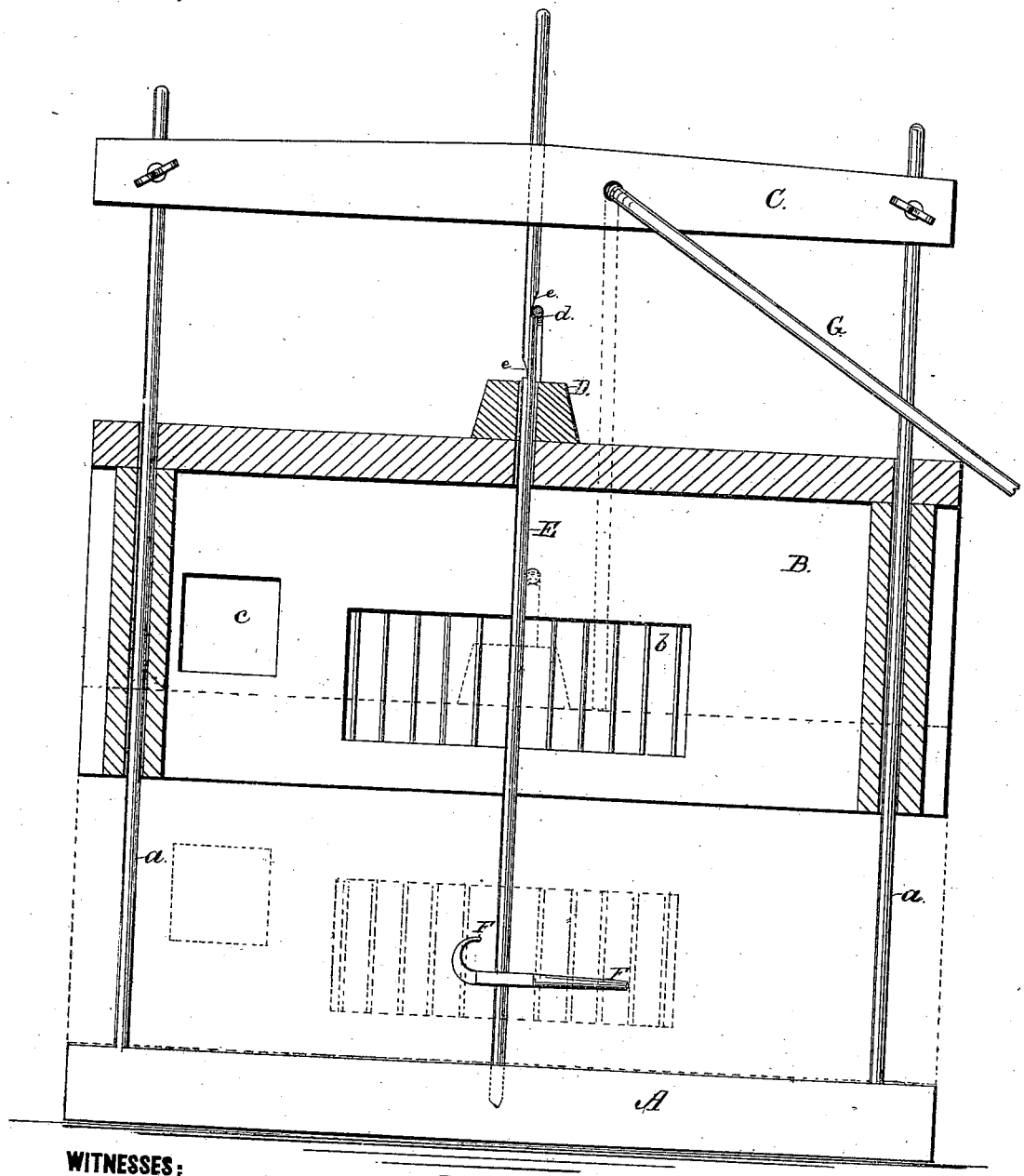

JOHN CRAWFORD, OF VANLUE, OHIO.

IMPROVEMENT IN ANIMAL-TRAPS.

Specification forming part of Letters Patent No. 196,436, dated October 23, 1877; application filed July 5, 1877.

*To all whom it may concern:*

Be it known that I, JOHN CRAWFORD, of Vanlue, in the county of Hancock and State of Ohio, have invented a new and Improved Animal-Trap; and I do hereby declare that the following is a full, clear, and exact description of the same, reference being had to the accompanying drawing, forming part of this specification, in which the figure is a side elevation, with the box or cage in section, in its elevated position, and with its thrown position indicated in dotted lines.

My invention covers certain improvements in animal-traps of that form in which a cage or box is allowed to drop upon the animal enticed by a bait beneath the same.

The improvements consist in a central axially-turning rod, having notches formed in the same, which are adapted to support a cage or box moving upon vertical guides, until said central rod is turned axially by the animal in removing the bait from an arm attached to the same, when the notches will be removed from the catch on the cage, and the latter allowed to drop bodily upon its guides over the animal.

In the drawing, A represents the base of the trap; B, the box or cage, and C an elevated cross-bar, connected with the base A by means of two or more guide-rods, *a a*. The box or cage, as here shown, is constructed in rectangular form, of wood, with openings *b* upon the sides, covered by gratings or metal rods, and has upon one of its sides a door, *c*. Two or more sides of this box are perforated vertically. Through said perforations pass the guide-rods *a*, so as to permit the box to slide loosely up and down upon the same. To the top of the box, also, is affixed a cross-bar, D, having a bent loop-shaped catch, *d*, and immediately beside this catch, and through a hole in the cross-bar D, extends a rod, E. This rod is stepped in the base A, and arranged to turn axially in the same, and also in a second bearing above in the elevated cross-bar C.

The box is made to slide loosely upon this center rod E, and its catch *d* is made to engage with one of a series of notches, *e*, formed on said rod, so as to support the box in an elevated position in setting the same.

F F are bait-arms attached to the lower portion of the rod, and projecting radially, so that an effort to remove the bait therefrom turns the rod axially.

In making use of my improved trap, the box is suspended at a suitable height upon the rod E, by causing the catch *d* to engage with one of the notches *e* on said rod. The bait being now exposed upon all sides of the trap, the animal approaches it without suspicion, and in his effort to remove the same from the arms F he turns the rod axially, removes the notch on rod E from the support on the box, and the latter drops down of its own gravity upon its guide-rods, imprisoning the animal.

In order to hold the box or cage down to its base tightly against the efforts of the imprisoned animal to lift the box, a locking-bar, G, is employed, which, as shown, consists of a bent U-shaped rod, pivoted at its bent end in the elevated cross-bar C, so as to drop down into a vertical position when the box falls, and, by abutting endwise against the same, prevents the latter from being lifted off the base.

Instead of making the bar double or bent into the U shape, a single pivoted bar could be employed.

The trap as thus described is designed to be used both upon a small scale, for catching rodentia, such as rats, mice, weasels, &c., and also in larger sizes, for catching all kinds of wild game.

The box may also be made of wood, and lined with sheet metal, or it may be made in the form of a cage, and constructed entirely of wire or metal rods.

With respect to the advantages of my trap, it will be seen that it is quickly set, easily thrown, and takes its game alive. The elevation, also, of the entire box or cage exposes the bait upon all sides, so that animals readily pass under the same without suspicion.

Having thus described my invention, what I claim as new is—

1. An axially-turning rod, E, provided with notches or supporting-seats above, and bait-arms below, in combination with a drop box or cage having a catch, substantially as and for the purpose described.

2. The axially-turning rod E, having notches $e$ and bait-arms F, in combination with the box B, having catch $d$, the base A, the cross-bar C, and the guide-rods $a$, substantially as and for the purpose described.

JOHN CRAWFORD.

Witnesses:
IRA PLOTTS,
J. A. ROLSTON.